(12) United States Patent
Hsiao

(10) Patent No.: US 6,464,052 B1
(45) Date of Patent: Oct. 15, 2002

(54) ROTATABLE HYDRAULIC DAMPER

(76) Inventor: Chun-Sung Hsiao, 4F, No. 2, Lane 297, An-Ching Street, San-Chung City, Taipei Hsien (TW)

( * ) Notice: Subject to any disclaimer, the term of this patent is extended or adjusted under 35 U.S.C. 154(b) by 0 days.

(21) Appl. No.: 10/073,197

(22) Filed: Feb. 13, 2002

(51) Int. Cl.[7] ............................................. F16D 57/02
(52) U.S. Cl. ...................................... 188/290; 188/293
(58) Field of Search ................................ 188/287, 290, 188/293, 296, 322.5; 16/307, 342, 54, 82

(56) References Cited

U.S. PATENT DOCUMENTS

| | | | | |
|---|---|---|---|---|
| 4,576,252 A | * | 3/1986 | Omata | 188/290 |
| 5,598,904 A | * | 2/1997 | Spyche, Jr. | 188/287 |
| 5,651,536 A | * | 7/1997 | Daul | 16/50 |
| 6,006,873 A | * | 12/1999 | Kirst | 188/287 |

* cited by examiner

Primary Examiner—Christopher P. Schwartz
(74) Attorney, Agent, or Firm—Bacon & Thomas, PLLC

(57) ABSTRACT

A rotatable hydraulic damper includes a tubular fixed member and a shaft has a section rotatably received in the fixed member. A sleeve is rotatably engaged with the inner periphery of the fixed member and mounted to the section of the shaft. A passage is defined longitudinally through the shaft and a cap is mounted to the section of the shaft and seals the open end of the fixed member. Two chambers are respectively defined in the fixed member and separated by the sleeve. A plurality of longitudinal grooves are defined in an inside of the sleeve and an end of the sleeve is sealed by a bead urged by a spring. The hydraulic oil in the two chambers flows through the sleeve at different speeds so that the pivotable object closes slower than it is opened.

7 Claims, 5 Drawing Sheets

US 6,464,052 B1

ROTATABLE HYDRAULIC DAMPER

FIELD OF THE INVENTION

The present invention relates to a damper which includes a movable sleeve rotatably received in a chamber and the speed of hydraulic oil in the chamber is different when opening and closing the pivotable object to which the damper is connected.

BACKGROUND OF THE INVENTION

A conventional hinge has two plates which are respectively fixedly connected to a fixed object and a pivotable object so that the pivotable object is able to be pivoted about the hinge. However, during closing the pivotable object, the pivotable object could slam the fixed object because the user unintentionally releases the pivotable object at a speed. A huge noise is generated when the pivotable object is slammed and the pivotable object could be damaged if it is made of plastic material such as the toilet lid or the door of washing machines.

SUMMARY OF THE INVENTION

In accordance with one aspect of the present invention, there is provided a rotatable hydraulic damper which comprises a tubular fixed member in which a movable sleeve is movably received. A shaft has a passage defined longitudinally therethrough and includes a first section and a second section with a flange extending outward from the shaft and located between the first section and the second section. A plurality of radial holes are defined radially through the second section and communicate with the passage. A first seal bolt seals the passage at a distal end of the first section. A spring and a bead are received in the passage in the second section and the bead is urged by the spring and seals the passage at a distal end of the second section. The second section of the shaft is rotatably received in the fixed member via the open end of the fixed member and the open end of the fixed member contacts the flange.

A movable sleeve is movably mounted to the second section of the shaft and located between the inner periphery of the fixed member and the second section of the shaft. A plurality of longitudinal grooves are defined in an inside of the sleeve. A plurality of spiral teeth are defined in an outer periphery of the sleeve and engaged with the spiral grooves of the fixed member.

A cap has a hole and the first section extends through the hole in the cap and an inside of the cap contacts the flange. The cap is fixedly connected to the open end of the fixed member.

The primary object of the present invention is to provide a rotatable hydraulic damper which allows the pivotable object to be opened at a higher speed and a lower speed when is closed.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
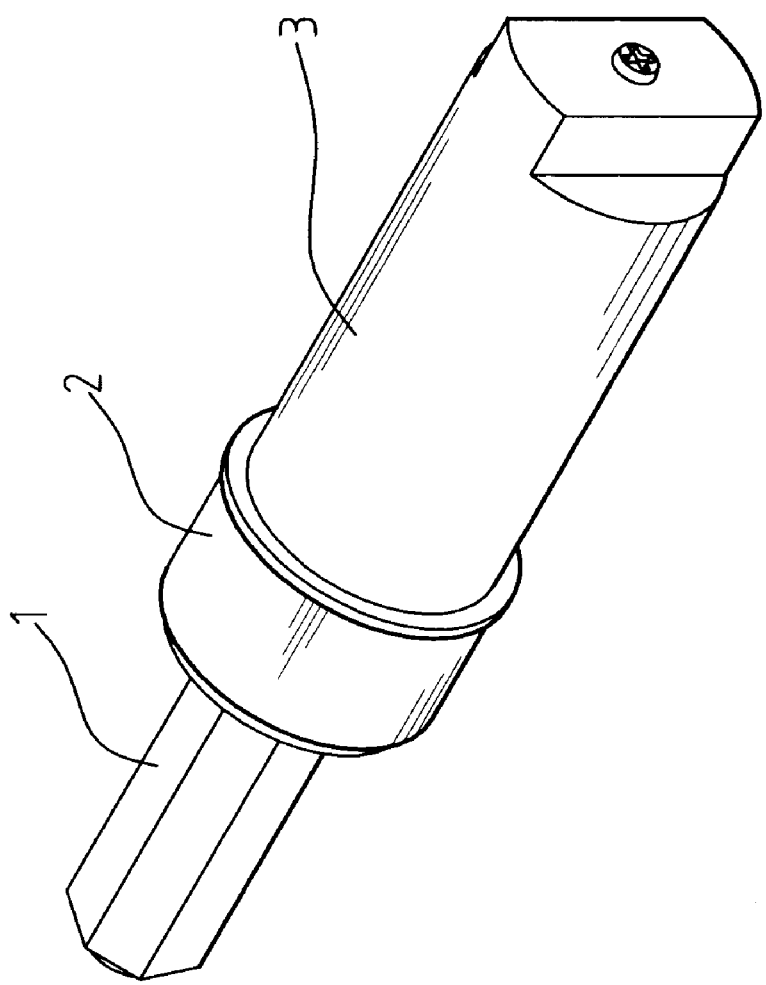
FIG. 1 is a perspective view to show the rotatable hydraulic damper of the present invention.
Figure 2:
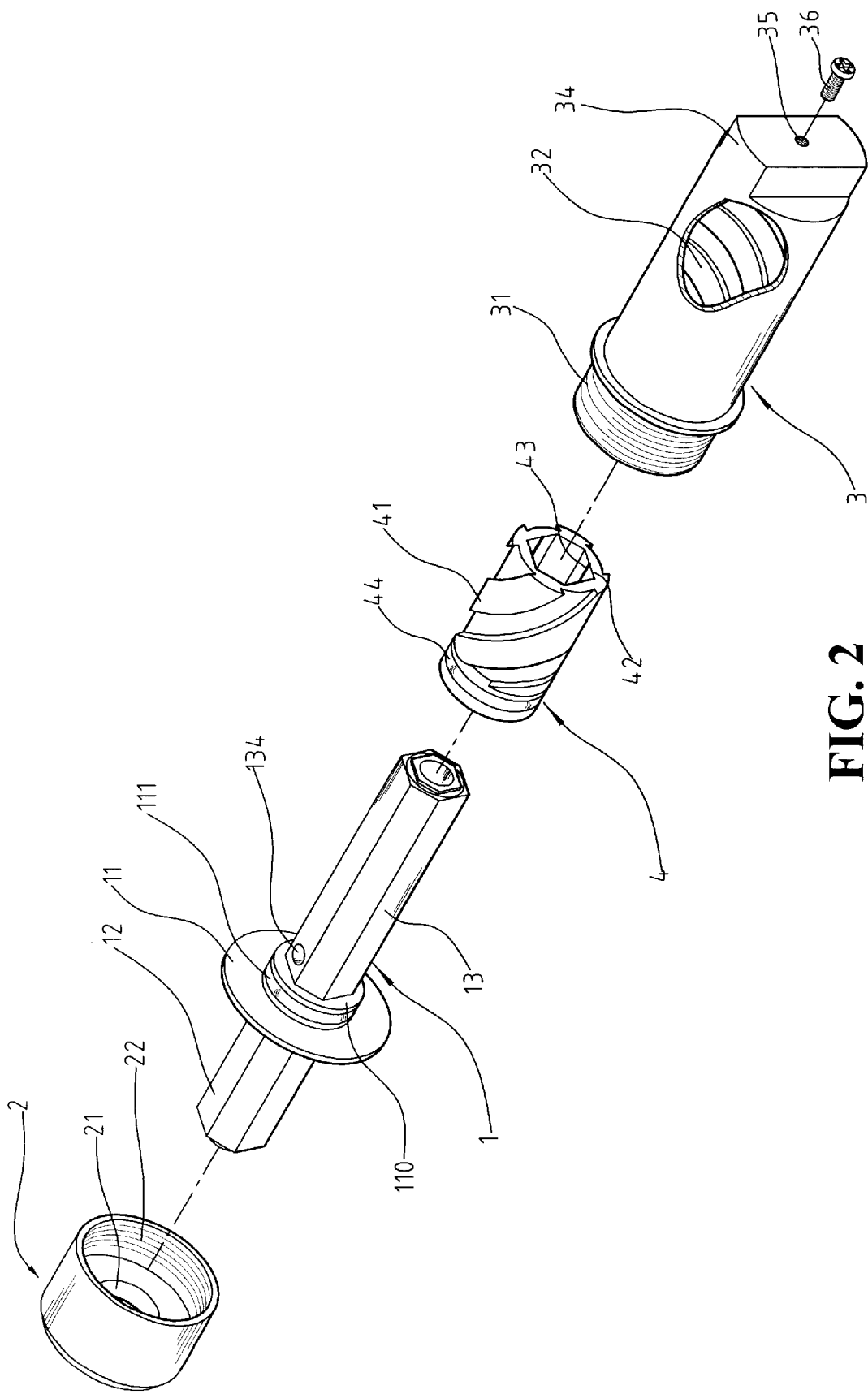
FIG. 2 is an exploded view to show the rotatable hydraulic damper of the present invention.
Figure 3:
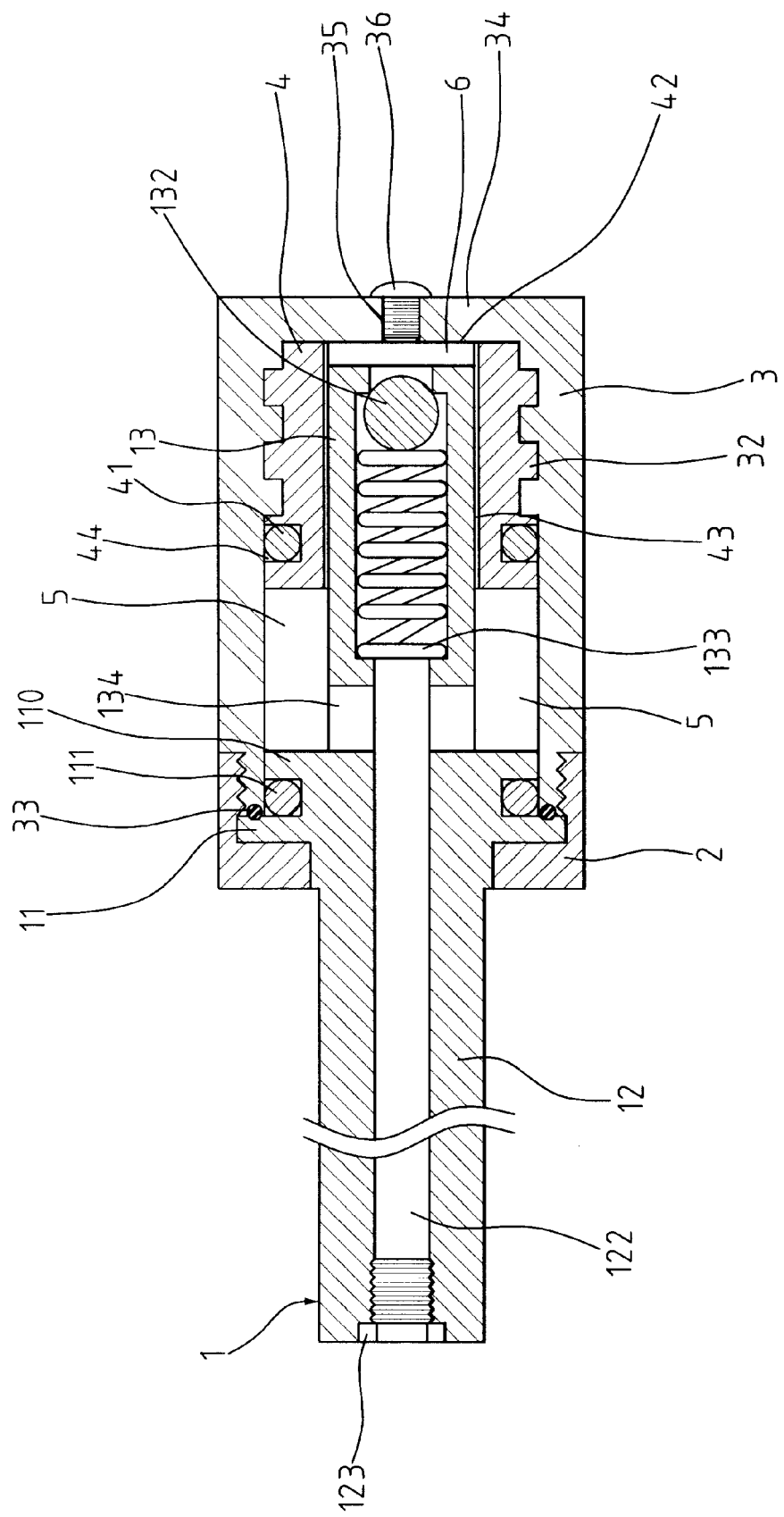
FIG. 3 is a cross sectional view to show the rotatable hydraulic damper of the present invention.

Referring to FIGS. 1 to 3, the rotatable hydraulic damper of the present invention comprises a tubular fixed member 3 which has an open end and a close end 34 which is fixedly connected to a fixed object of the door assembly. A plurality of spiral grooves 32 are defined in an inner periphery thereof. The close end 34 is located at the opposite end of the open end and an aperture 35 is defined through the close end 34 and sealed by a seal bolt 36. A plurality of outer threads 31 are defined in an outer periphery of the open end.

A shaft 1 with a polygonal outer shape has a passage 122 defined longitudinally therethrough and includes a first section 12 and a second section 13. A flange 11 extends radially outward from the shaft 1 and is located between the first section 12 and the second section 13. A plurality of radial holes 134 are defined radially through the second section 13 and communicate with the passage 122. A seal bolt 123 seals the passage 122 at a distal end of the first section 12. A spring 133 and a bead 132 are received in the passage 122 in the second section 13 and the bead 132 is urged by the spring 133 and seals the passage 122 at a distal end of the second section 13. The second section 13 of the shaft 1 is rotatably received in the fixed member 3 via the open end of the fixed member 3 and the open end of the fixed member 3 contacts the flange 11. An annular step portion 110 extends radially from the shaft 1 and is located beside the flange 11. A seal 111 is mounted on the step portion 110 and contacts an inner periphery of the open end of the fixed member 3. A seal 33 is engaged with an end surface of the open end of the fixed member 3 and the first seal 33 contacts the flange 11.

A movable sleeve 4 has a polygonal inside 42 which receives the second section 13 of the shaft 1. The sleeve 4 is located between the inner periphery of the fixed member 3 and the second section 13 of the shaft 1. A plurality of longitudinal grooves 43 are defined in an inside of the sleeve 4. A plurality of spiral teeth 41 are defined in an outer periphery of the sleeve 4 and engaged with the spiral grooves 32 of the fixed member 3. A first chamber 5 is defined between the sleeve 4, the second section 13 of the shaft 1 and the annular step portion 110. A second chamber 6 is defined between the close end 34 of the fixed member 3, the polygonal inside 42 of the sleeve 4 and the distal end of the second section 13 of the shaft 1.

A cap 2 has a hole 21 and the first section 12 of the shaft 1 extends through the hole 21 in the cap 2 and an inside of the cap 2 contacts the flange 11. The cap 2 has inner threads 22 defined in an inner periphery thereof and the inner threads 22 are engaged with the outer threads 31 of the fixed member 3. A seal 44 is mounted to the sleeve 4 and contacts an inner periphery of the open end of the fixed member 3. Hydraulic oil is filled in the passage 122 of the shaft 1, the first chamber 5 and the second chamber 6.

Figure 4:
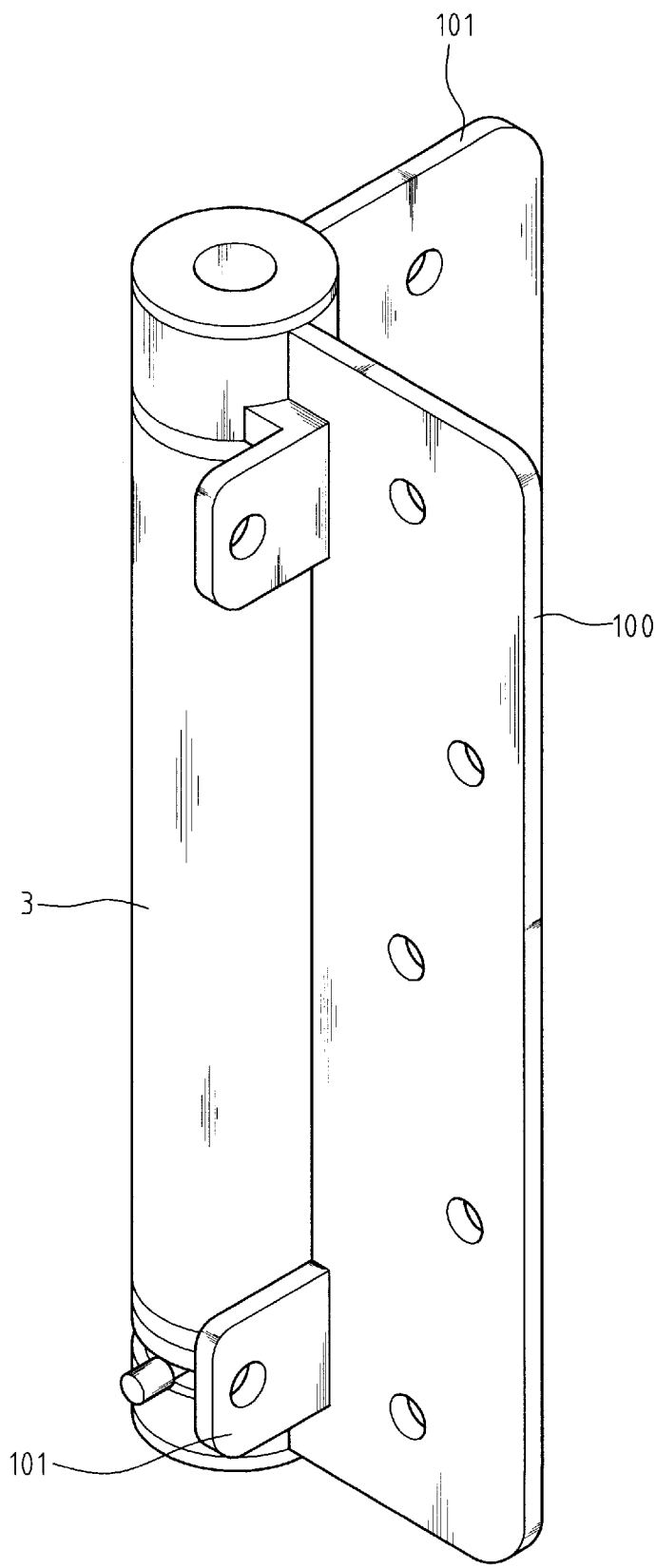
FIG. 4 is a perspective view to show two plates are connected to the rotatable hydraulic damper of the present invention.
Figure 5:
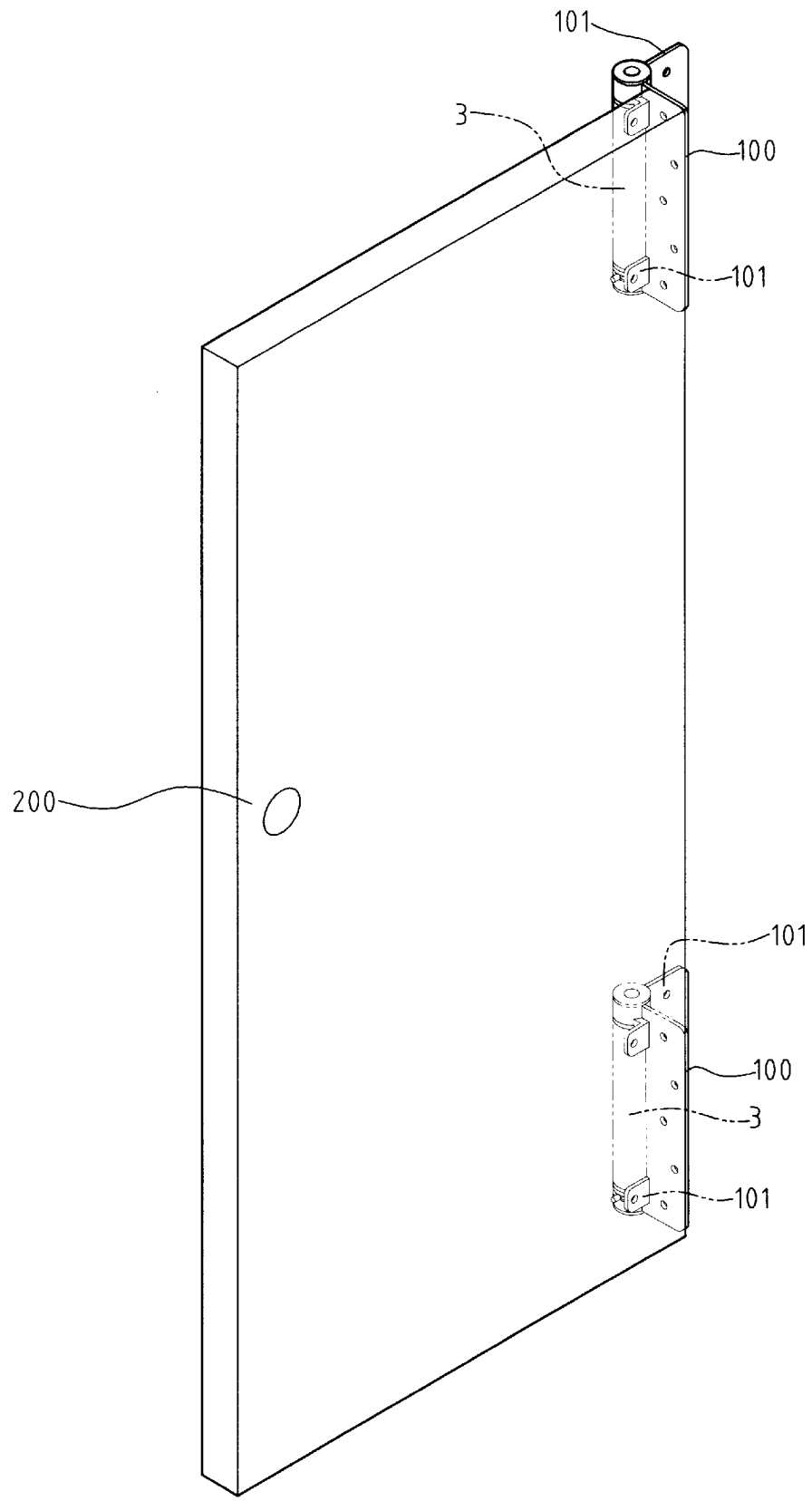
FIG. 5 shows two rotatable hydraulic damper of the present invention are used with a door.

FIGS. 4 and 5, two plates 100, 101 are connected to the rotatable hydraulic damper of the present invention and respectively connected to the door 200 and the door post. When opening the door 200, the shaft 1 is rotated to let the sleeve 4 move toward the close end 34 of the fixed member along the spiral grooves 32, the oil in the second chamber 6 is pressed and pushes the bead 132 to press the spring 133. The oil flows through the sleeve 4 to the first chamber 5. When closing the door 200, the shaft 1 is rotated in opposite direction and the sleeve 4 moves toward the annular step portion 110, the oil in the first chamber 5 urges the bead 132. The oil can only flow to the second chamber 6 via the longitudinal grooves 43 of the sleeve 4. Therefore, the speed of the oil flows during the opening stroke is higher than that in the closing stroke.

While we have shown and described the embodiment in accordance with the present invention, it should be clear to those skilled in the art that further embodiments may be made without departing from the scope of the present invention.

What is claimed is:

1. A rotatable hydraulic damper comprising:

a tubular fixed member having spiral grooves defined in an inner periphery thereof, the fixed member having an open end;

a shaft having a passage defined longitudinally therethrough and including a first section and a second section with a flange extending radially outward from the shaft and located between the first section and the second section, a plurality of radial holes defined radially through the second section and communicating with the passage, a first seal bolt sealing the passage at a distal end of the first section, a spring and a bead received in the passage in the second section and the bead urged by the spring and sealing the passage at a distal end of the second section, the second section of the shaft rotatably received in the fixed member via the open end of the fixed member and the open end of the fixed member contacting the flange;

a movable sleeve movably mounted to the second section of the shaft and located between the inner periphery of the fixed member and the second section of the shaft, a plurality of longitudinal grooves defined in an inside of the sleeve, a plurality of spiral teeth defined in an outer periphery of the sleeve and engaged with the spiral grooves of the fixed member, and a cap having a hole and the fist section extending through the hole in the cap and an inside of the cap contacting the flange, the cap fixedly connected to the open end of the fixed member.

2. The rotatable hydraulic damper as claimed in claim 1, wherein the fixed member has a close end opposite to the open end and an aperture is defined through the close end and sealed by a second seal bolt.

3. The rotatable hydraulic damper as claimed in claim 1, further comprising outer threads defined in an outer periphery of the open end and the cap has inner threads defined in an inner periphery thereof, the inner threads being engaged with the outer threads.

4. The rotatable hydraulic damper as claimed in claim 1, further comprising a first seal engaged with an end surface of the open end of the fixed member and the first seal contacting the flange.

5. The rotatable hydraulic damper as claimed in claim 1, further comprising an annular step portion extending radially from the shaft and located beside the flange, a second seal mounted on the step portion and contacting an inner periphery of the open end of the fixed member.

6. The rotatable hydraulic damper as claimed in claim 1, further comprising a third seal mounted to the sleeve and contacting an inner periphery of the open end of the fixed member.

7. The rotatable hydraulic damper as claimed in claim 1, wherein the shaft has a polygonal outer shape and the sleeve has a polygonal inside which receives the shaft.

* * * * *